US009529391B2

(12) United States Patent
Ely (10) Patent No.: US 9,529,391 B2
(45) Date of Patent: Dec. 27, 2016

(54) BUTTON RETENTION, ASSEMBLY, AND WATER SEALING (71) Applicant: Apple Inc., Cupertino, CA (US)

(72) Inventor: Colin M. Ely, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 231 days.

(21) Appl. No.: 14/040,386

(22) Filed: Sep. 27, 2013

(65) Prior Publication Data

US 2015/0092345 A1 Apr. 2, 2015

(51) Int. Cl.
G06F 1/16 (2006.01)
H01H 9/04 (2006.01)
H04M 1/23 (2006.01)
H04M 1/18 (2006.01)

(52) U.S. Cl.
CPC .............. *G06F 1/1656* (2013.01); *H01H 9/04* (2013.01); *H04M 1/236* (2013.01); *H01H 2217/01* (2013.01); *H01H 2221/024* (2013.01); *H01H 2221/028* (2013.01); *H01H 2221/052* (2013.01); *H01H 2221/058* (2013.01); *H01H 2223/002* (2013.01); *H04M 1/18* (2013.01); *Y10T 29/49826* (2015.01)

(58) Field of Classification Search
CPC H01H 9/04; H01H 2217/01; H01H 2221/024; H01H 2221/028; H01H 2221/052; H01H 2221/058; H01H 2223/002; H01H 13/06; H01H 13/063; H01H 9/041; H01H 2009/048; H04M 1/236; Y10T 29/49826
USPC ........................................... 200/302.1–302.3
See application file for complete search history.

(56) References Cited

U.S. PATENT DOCUMENTS 3,950,627 A * 4/1976 Murata ................. H01H 13/12
                                           200/302.2
5,041,330 A   8/1991 Heerton et al.
5,179,505 A   1/1993 Matsuo
(Continued)

FOREIGN PATENT DOCUMENTS

CN  102565149   7/2012
CN  105049966   11/2015
(Continued)

OTHER PUBLICATIONS

Author Unknown, "What to Do when Gadgets Get Wet," http://gadgetshow.channel15.com/gadget-show/blog/what-to-do-when-gadgets-get-wet, 2 pages, Aug. 23, 2010.

*Primary Examiner* — David M Sinclair
*Assistant Examiner* — Robert Brown
(74) *Attorney, Agent, or Firm* — Brownstein Hyatt Farber Schreck, LLP (57) ABSTRACT A sealed physical button for use with a portable electronic device that effectively presents ingress of liquids. Embodiments include a button cap having flange portions that interlock with complementary flanges from a button retainer. The button cap may also include a downward oriented central post, proportioned and oriented to interface with the top surface of a button attached to a bracket. The button retainer may include an aperture sized and positioned to receive the central post of the button cap. The button retainer may rest on a shelf within the electronic device housing such that the shelf interposes the bracket and the retainer to form a rigid seal.

19 Claims, 10 Drawing Sheets

(56) References Cited

U.S. PATENT DOCUMENTS

| | | | |
|---|---|---|---|
| 5,258,592 A * | 11/1993 | Nishikawa | H01H 13/52 200/302.2 |
| 5,373,487 A | 12/1994 | Crawford et al. | |
| 6,166,662 A * | 12/2000 | Chuang | H01H 13/702 200/302.2 |
| 6,292,358 B1 | 9/2001 | Lee et al. | |
| 6,389,143 B1 | 5/2002 | Leedom et al. | |
| 6,855,173 B2 | 2/2005 | Ehrnsperger et al. | |
| 6,963,039 B1 * | 11/2005 | Weng | H01H 23/06 200/302.1 |
| 7,075,781 B2 | 7/2006 | Peng | |
| 7,365,281 B2 * | 4/2008 | Yamaguchi | G06F 3/0202 200/302.1 |
| 7,580,533 B2 | 8/2009 | Schwartz | |
| 7,748,272 B2 | 7/2010 | Kranz et al. | |
| 7,865,210 B2 | 1/2011 | Wang et al. | |
| 8,059,490 B2 | 11/2011 | Rapps et al. | |
| 8,092,691 B2 | 1/2012 | Youngs et al. | |
| D653,640 S | 2/2012 | Kwon et al. | |
| 8,231,795 B2 | 7/2012 | Martin et al. | |
| 8,263,886 B2 * | 9/2012 | Lin | H01H 13/063 200/302.2 |
| 8,367,928 B2 | 2/2013 | Hsu et al. | |
| 8,371,866 B1 | 2/2013 | Su et al. | |
| 8,381,575 B2 | 2/2013 | Seo | |
| 8,416,542 B2 | 4/2013 | Nakamura | |
| 8,446,713 B2 * | 5/2013 | Lai | H01H 13/86 361/679.01 |
| 8,462,514 B2 | 6/2013 | Myers et al. | |
| 8,470,252 B2 | 6/2013 | Odueyungbo | |
| 8,482,305 B2 | 7/2013 | Johnson | |
| 8,526,175 B2 | 9/2013 | Yukawa et al. | |
| 8,562,095 B2 | 10/2013 | Alleyne et al. | |
| 8,591,240 B2 | 11/2013 | Jenks | |
| 8,614,897 B2 | 12/2013 | Tang | |
| 8,644,011 B2 | 2/2014 | Parkinson | |
| 8,683,861 B2 | 4/2014 | Humbert et al. | |
| 8,767,381 B2 | 7/2014 | Shukla et al. | |
| 8,770,996 B2 | 7/2014 | Hsu | |
| 8,800,764 B2 * | 8/2014 | Wu | A45C 11/00 206/320 |
| 8,804,993 B2 | 8/2014 | Shukla et al. | |
| 8,826,558 B2 | 9/2014 | Priebe et al. | |
| 8,844,158 B2 | 9/2014 | Dehn | |
| 8,942,401 B2 | 1/2015 | Murayama | |
| 8,960,818 B2 | 2/2015 | Myers et al. | |
| 8,994,827 B2 * | 3/2015 | Mistry | H04N 5/2252 348/158 |
| 9,013,888 B2 | 4/2015 | Trzaskos et al. | |
| 9,072,991 B2 | 7/2015 | Winters et al. | |
| 9,080,961 B2 | 7/2015 | Adachi | |
| 9,084,053 B2 | 7/2015 | Parkins | |
| 9,105,420 B2 * | 8/2015 | Shah | H01H 11/00 |
| 9,161,434 B2 | 10/2015 | Merz et al. | |
| 9,164,539 B2 | 10/2015 | Wu | |
| 9,171,535 B2 | 10/2015 | Abe et al. | |
| 9,226,076 B2 * | 12/2015 | Lippert et al. | |
| 9,240,292 B1 * | 1/2016 | Lapetina | H01H 9/04 |
| 9,253,297 B2 | 2/2016 | Abe et al. | |
| 2002/0056627 A1 * | 5/2002 | Rochon | H01H 13/7006 200/302.2 |
| 2006/0065514 A1 * | 3/2006 | Toyama | H01H 13/023 200/310 |
| 2006/0210062 A1 | 9/2006 | DeMichele et al. | |
| 2006/0256510 A1 * | 11/2006 | Nakasono | G07C 9/00944 361/679.02 |
| 2007/0003081 A1 | 1/2007 | Ram et al. | |
| 2007/0034493 A1 * | 2/2007 | Kawasaki | H01H 13/86 200/302.2 |
| 2008/0302641 A1 * | 12/2008 | Su | H01H 9/04 200/302.3 |
| 2009/0281251 A1 | 11/2009 | Bae et al. | |
| 2011/0005908 A1 * | 1/2011 | Lin | H01H 13/063 200/302.2 |
| 2012/0067711 A1 * | 3/2012 | Yang | H01H 13/86 200/341 |
| 2012/0318651 A1 * | 12/2012 | Chiang | H01H 13/705 200/293 |
| 2013/0037396 A1 * | 2/2013 | Yu | H01H 23/04 200/293 |
| 2013/0146491 A1 | 6/2013 | Ghali et al. | |
| 2013/0170685 A1 | 7/2013 | Oh et al. | |
| 2013/0242481 A1 | 9/2013 | Kim et al. | |
| 2013/0299324 A1 * | 11/2013 | Kanbayashi | H01H 9/04 200/302.1 |
| 2014/0029206 A1 | 1/2014 | Wittenberg et al. | |
| 2014/0069782 A1 * | 3/2014 | Shedletsky | H01H 13/50 200/17 R |
| 2014/0071081 A1 * | 3/2014 | Shedletsky | G06F 1/1643 345/174 |
| 2014/0139637 A1 * | 5/2014 | Mistry | H04N 5/2252 348/46 |
| 2014/0218877 A1 | 8/2014 | Wei et al. | |
| 2014/0253150 A1 | 9/2014 | Menzel et al. | |
| 2015/0003213 A1 | 1/2015 | Suwald | |
| 2016/0052017 A1 | 2/2016 | Weber et al. | |

FOREIGN PATENT DOCUMENTS

| | | |
|---|---|---|
| CN | 204906680 | 12/2015 |
| CN | 105323674 | 2/2016 |
| EP | 0799747 | 10/1997 |
| EP | 2326106 | 5/2011 |
| EP | 2640042 | 9/2013 |
| JP | S5620399 | 2/1981 |
| JP | 200353872 | 2/2003 |
| JP | 200483811 | 3/2004 |
| JP | 2004235724 | 8/2004 |
| JP | 2004244607 | 9/2004 |
| JP | 2012253426 | 12/2012 |
| WO | WO2012/117476 | 9/2012 |
| WO | WO2015/167848 | 11/2015 |

* cited by examiner

BUTTON RETENTION, ASSEMBLY, AND WATER SEALING

TECHNICAL FIELD

This disclosure relates generally to a sealed button assembly, and in particular, to button cap retaining and translation guide features of liquid-impermeable button assemblies.

BACKGROUND

Increased demand for continued advancement of electronic devices has motivated improvements in durability, thinness, and portability of electronic devices. These devices may include cell phones, smart phones, tablet computers, laptop computers, wearable devices, navigation devices, sports devices, accessory devices, peripheral input devices, or other similar products.

Such devices may include apertures in the external housing sized to receive physical buttons. However, as the device is introduced to diverse environmental conditions foreign matter such as dust, lint, condensation, and liquid may penetrate the gap between the button and the housing defined by the size of the aperture. Foreign matter, especially liquids such as water, may undesirably interfere with normal device operation or, in other cases, may irreparably damage internal components. Accordingly, many electronic devices are manufactured with apertures sized to minimize the gap between a physical button and a housing. These devices often include liquid seals such as gaskets about the perimeter of the aperture to prevent and impede ingress of foreign matter. Such liquid seals must be larger than the perimeter opening in order to provide an effective seal.

In addition, liquid seals about the perimeter of the aperture in a housing may be at least partially connected to the movable button cap in order to provide an effective seal through all positions of the button cap. Thus, the larger the perimeter of the button cap, the larger the movable portion of the liquid seal must be. In some examples, large movable portions of liquid seals may be subject to higher failure rates. Further, as a result of the increased size, larger seals may require a button to be positioned a certain minimum distance away from other components of the electronic device. As a result, liquid sealed buttons may not be feasible for particularly thin or compact devices.

Further, in order to reliably attach a physical button to an electronic device housing such that a liquid seal functions as intended, specialized geometry along the interior perimeter of the electronic device housing is often required. For example, screw taps are often machined into the housing adjacent to a button aperture to receive screws that hold the physical button and associated seals in place. Such additional machining steps may increase manufacturing cost, time, and part rejection. Additional machining steps may also decrease the structural integrity of the housing, increase the footprint of the button attachment mechanism, and increase the size, shape, and cost of necessary liquid seals.

Furthermore, aesthetically pleasing electronic devices may require physical buttons taking specially designed shapes. In some examples, if a specially designed physical button is not pressed at its center, it may pivot instead of translating downward. This may cause frustration, as pivoting may fail to activate the button. Accordingly, many electronic devices are manufactured with vertical translation guides positioned below physical buttons which may substantially distribute downward force across the button area, thereby preventing or reducing pivoting and ensuring button activation. However, the additional required parts for the vertical translation guide mechanism may increase manufacturing cost and assembly time in addition to increasing the internal volume the sealed physical button requires.

Accordingly, there may be a present need for a physical button for use with a portable electronic device that is not constrained to particular dimensions or shapes, does not require specialized attachment mechanisms, or additional space within a housing, that is liquid sealed in a durable and reliable way, and may be consistently activated by pressing any portion of the surface of the button cap.

SUMMARY

Embodiments described herein may relate to, or take the form of, a sealed button with a unitary housing member. The sealed button assembly may include a button cap having a flange which may extending outwardly or inwardly. A post may be coupled to the button cap extending downward. The coupling between the post and the button cap may include a tuning shim. The sealed button assembly may also include a housing having a shelf portion extending within internal volume of the housing.

Positioned above and sealed to the shelf may be a retainer having a flange complementary to the flange of the button cap and an aperture positioned to receive the post. The complimentary flange may extend in an opposite direction of the flange of the button cap. For example, if the flange of the button cap extends inwardly, the complementary flange of the button retainer may extend outwardly. The complementary flange may interlock with the flange of the button cap, permitting vertical translation within a defined range. For example, the button retainer flange may impact the flange of the button cap if the button cap is lifted, preventing the button cap from separating from the button retainer. In another example, the button retainer flange may impact the flange of the button cap if the button cap is depressed a select amount, preventing the button cap from translating excess force to components below.

The flanges of the button retainer and the button cap may interlock in an assembly process. For example, the flanges may interlock by positioning the central post of the button cap within the aperture of the button retainer at an angle, such that the longitudinal axis of the button cap is skewed with respect to the longitudinal axis of the button retainer. The button cap may then rotate about an axis defined by the central post and aperture such that the longitudinal axis of the button cap is substantially parallel with the longitudinal axis of the button retainer. In this manner, the respective flanges may interlock.

In other embodiments, the interlock of the flanges of the button cap and the button retainer is accomplished by sliding the button cap over the button retainer. In still further embodiments, the interlock is accomplished by pressing the button cap over the retainer such that the flanges temporarily displace to snap together. In still further embodiments, a combination of assembly processes may be used. For example, a button cap may first slide, then rotate in order to interlock with complementary flange portions of a button retainer.

The sealed button assembly may also include a switch axially aligned with the post inserted through the aperture. In some embodiments, a top activation surface of the switch (e.g., apex of a dome switch) may interface the bottom surface of the post. In this manner, depression of the post translates to depression of the switch. The sealed button assembly may lastly include a bracket fixedly coupled to the retainer so that the shelf portion at least partially interposes the bracket and the retainer. In some examples, the bracket may be coupled to the retainer with one or more screws.

Further embodiments of a sealed button assembly may include a variety of seals between the several components. For example, a seal may be positioned between the post and the aperture. In some embodiments, this seal may be an O-ring. Additional examples may include a seal poisoned about the perimeter of the button retainer, or a seal positioned around the perimeter of the button itself. Many seals contemplated herein may be pressure sensitive adhesives.

Some embodiments include a button cap and a button retainer having an oblong shape. In these embodiments, the length of the top surface of the button cap may be substantially greater than the perpendicular width at the center point across the same top-down cross section. Various oblong shapes are contemplated. For example, the button cap may take the shape of a rounded rectangle, lozenge, cornered rectangle, trapezoid, ellipse, or other oblong shape. Other embodiments contemplated herein include a button cap having an axially symmetric shape (e.g., square or circle).

Embodiments described herein may also relate to or take the form of a translation guide for an oblong button. A translation guide may assist an oblong button during off-center application of pressure by a user to depress in a substantially uniform way. For example, an oblong button depressed proximate an end point may undesirably pivot instead of uniformly displacing downward. Accordingly, the translation guide described herein may include a central aperture for receiving an alignment post that may extend from a button cap. The guide may also include at least a first and second flange positioned longitudinally opposite each other. Each of the flanges may be proportioned and oriented to interlock each with a respective flange of a button cap. As described above, the flanges may define a translation range of the button cap. In this manner, when a first end of a button cap is pushed downward, the opposite flange of the translation guide may prevent the opposite end of the button cap from displacing upward, thus preventing pivoting of the button cap.

Embodiments described herein may also relate to, or take the form of, a method for assembling a sealed button including several steps. The method may begin by selecting a button cap having a central post and a first and second extension portions each having a flange. Next the method may include selecting a button retainer having an aperture proportioned and oriented to receive the central post of the button cap, the button retainer also having a first and second flange portions. The method continues by of positioning the central post within the aperture such that the longitudinal axis of the button cap is skewed at an angle with respect to the longitudinal axis of the button retainer. Thereafter, the method may rotate the button cap about an axis defined by the central post and aperture so that the longitudinal axis of the button cap is substantially parallel with the longitudinal axis of the button retainer. The aligned button cap and button retainer may next by positioned within within a housing proportioned to rotationally fix the button cap. Lastly, a bracket may be coupled to the button retainer through the housing.

BRIEF DESCRIPTION OF THE DRAWINGS

Reference will now be made to a number of representative embodiments illustrated within the accompanying figures. The following descriptions are not intended to suggest or otherwise limit the illustrated or described embodiments to a single preferred embodiment. To the contrary, it is intended that the description and figures cover alternatives, modifications, and equivalents as may be contemplated within the scoped defined by the appended claims.

The use of the same or similar reference numerals in different drawings indicates similar, related, or identical items.

DETAILED DESCRIPTION

Various embodiments described herein relate to, or may otherwise take the form of a sealed physical button for use with a portable electronic device that effectively presents ingress of foreign matter, including liquids. In certain embodiments a button cap may have flange portions, or wings, that may interlock with complementary flanges from a button retainer. The button cap may also include a downward oriented central post. The post may be proportioned and oriented to interface with the top surface of a dome switch or other button type. The button retainer may include an aperture sized and positioned to receive the central post of the button cap. In addition, the button retainer may also be fixedly coupled through an aperture within the housing of the electronic device to a bracket which may include a button. In some embodiments, the button retainer may rest on a shelf present within the housing such that the shelf at least partially interposes the bracket and the retainer. The central post may extend sufficiently through the aperture within the button retainer to engage the top surface of the button.

In certain embodiments, the coupling between the button retainer and the bracket may be rigid enough to prevent ingress of foreign matter. In further embodiments, a pressure sensitive adhesive may be applied to the underside of the button retainer such that when assembled, but pressure sensitive adhesive forms a seal. In other embodiments, a seal ring such as an O-ring may be positioned about the center post in order to form a seal between the central post and the button retainer, forming a seal between the post and the sidewall of the aperture within the button retainer. In further embodiments, a seal may be positioned around the perimeter of the aperture within the button retainer, bonding to the top surface of the button.

Other embodiments described herein may also relate to a translation guide for an physical button. As noted, if a physical button is not pressed at its center, the button may pivot about a central anchor point instead of translating downward. This may cause frustration, as pivoting may fail to activate the button. Certain embodiments may assist an off-center application of pressure to a button. Button translation assistance may be provided by a range of motion defined by the wings or flanges of the button retainer. For example, the button retainer flange may be positioned to allow the button cap to downwardly translate a certain distance. With the same geometry, the button retainer flange may also prevent the button cap from upward translation at all. Such geometry may provide several features. For example, by preventing the button cap from upward translation, the button retainer may maintain the button cap within the housing. In another embodiment, the flanges of the button retainer may be positioned longitudinally opposite one another. In other words, interlocking with opposite ends of a button cap. In this manner, each of the flanges defines a range of motion for a respective one of two flanges of the button cap. In this manner, if one edge of a button cap is pressed downward a pivot motion may be encouraged, as described above. In such an embodiment the position of the flanges of the button retainer may prevent upward translation of the button cap at the pivot-opposite end.

Figure 1:
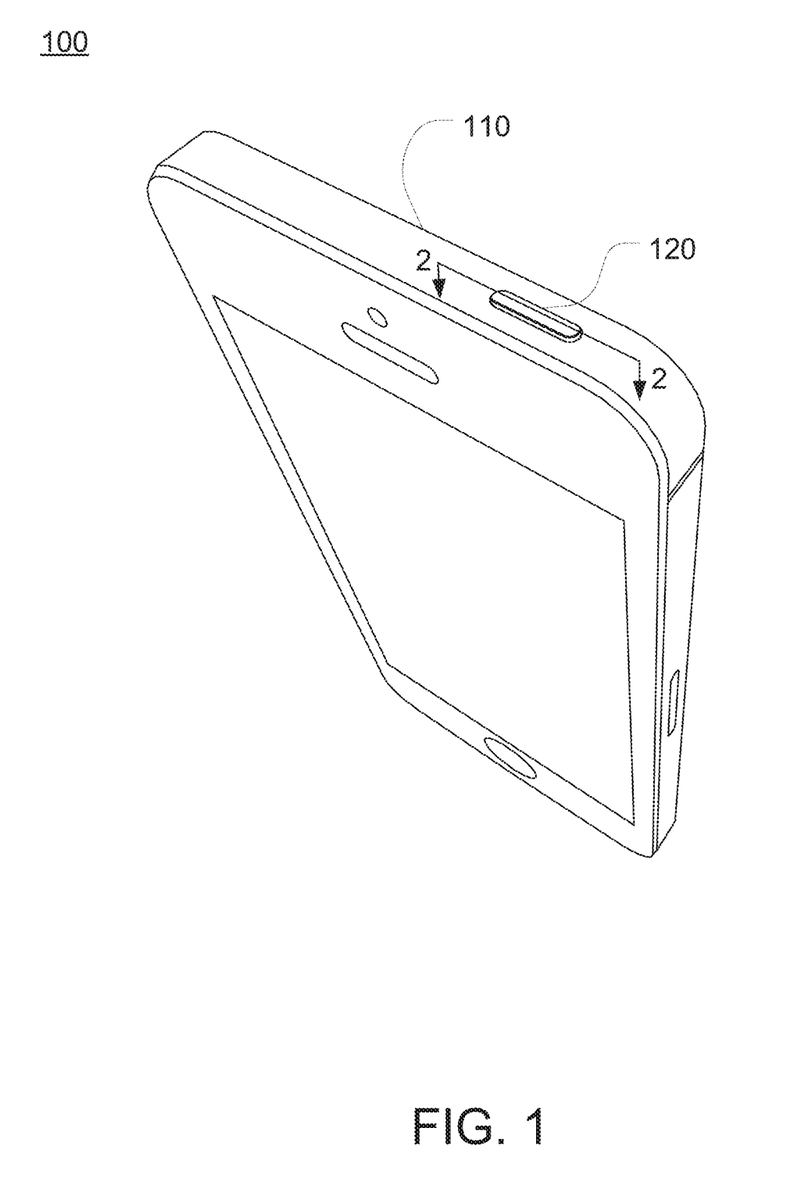
FIG. 1 is a top down perspective view of an embodiment of a portable electronic device having a water tight button.

FIG. 1 is a top down perspective view of an embodiment of a portable electronic device 100 having a sealed button. The exemplary electronic device 100 may include a housing 110 and a sealed button 120 may be oblong in shape. In some embodiments, a portable electronic device such as that shown in FIG. 1 may include a full view or substantially full view display area disposed within the housing 110 that consumes a majority if not all of the front surface of the electronic device. One may appreciate that a display area may be embodied in a variety of ways. In one example, the display may consist of at least a display such as a flat panel display and more particularly an LCD display. In further embodiments, the portable electronic device 100 may not have a display at all.

Figure 2A:
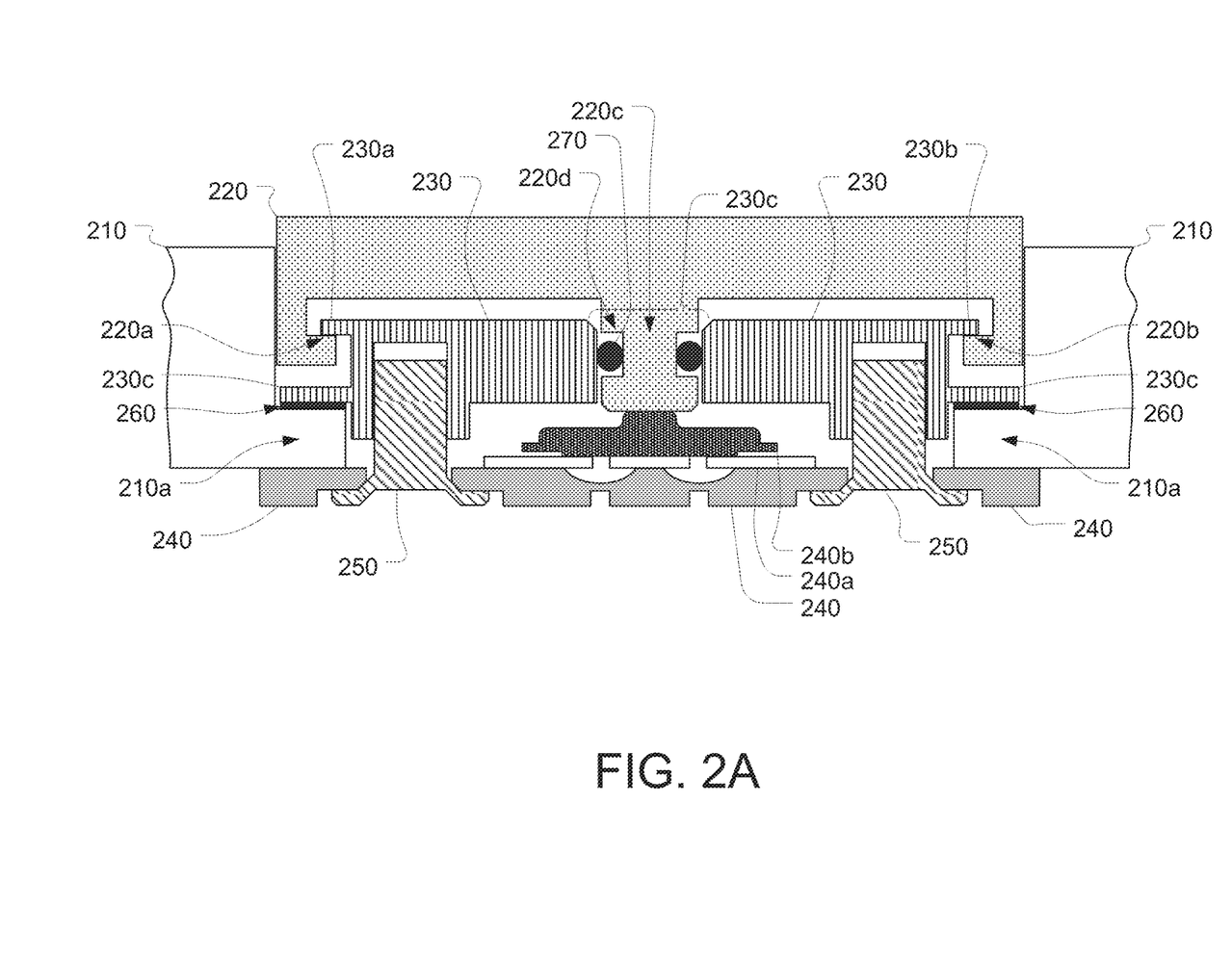
FIG. 2A is an enlarged cross section of the embodiment shown in FIG. 1, taken along line 2-2.

FIG. 2A is an enlarged cross section of the embodiment shown in FIG. 1, taken along line 2-2. An electronic device housing 210 encloses a button cap 220, a button retainer 230 and a bracket 240. Connecting the button retainer 230 to the bracket 250 are screws 250.

The housing 210 may include shelf portions 210a and 210b. These shelf portions 210a and 210b may be machined out of the housing in a manufacturing process or, in other embodiments, the housing may be molded with the shelf portions 210a and 210b in place. The shelf portions 210a and 210b may partially define an aperture opened within the housing (not labeled). The aperture may be sized to receive the button cap 220.

The button cap 220 is illustrated having geometry consistent with an embodiment described herein. Central to the button cap 220 is a central post 200c. The central post 220c may include a groove 220d in order to receive an O-ring 270. The O-ring 270 may be stretched over the central post 220c in a manufacturing process. Also included within the button cap 220 are the flange portions 220a and 220b, illustrated on opposite sides of the button cap 220.

The button retainer 230 may include specialized geometry. The button retainer 230 may include the flange portions 230a and 230b which align and interlock with the flange portions 220a and 220b of the button cap 220 respectively. The button retainer 230 may also include the shelf interface portions 230c and 230d. The shelf interface portions 230c and 230d may be positioned to align above a portion of the housing 210. The shelf interface portions 230c and 230d may be fixedly coupled to the shelf portions 210a and 210b of the housing 210. In certain embodiments, an adhesive 260 may bond the shelf portions 210a and 210b to the shelf interface portions 230c and 230b. In further embodiments, the adhesive 260 may not be required. Instead, the shelf interface portions 230c and 230d may interface the shelf portions 210a and 210b by friction only. In still further embodiments, the shelf interface portions 230c and 230d may be laser or otherwise welded to the shelf portions 210a and 210b.

The button retainer 230 may also include an aperture 230c that is proportioned and oriented to receive the central post 220c of the button cap 220. The aperture 230c may have a larger cross sectional area than the central post 220c in order for the central post 220 to be received and movable therein. The aperture 230c may be sized in order to interface with the O-ring 270. In this manner, the aperture 230c and the central post 270 may be movably sealed against one another.

Fixedly coupled to the button retainer 230 may be a bracket 240. The bracket portion 240 may include a substrate portion 240a on which a button 240b is fixed. The button 240b may be any suitable button. For example, the button 240b may be a dome switch.

The button retainer 230 may be coupled to the bracket 240 with the screws 250. In the illustrated embodiment, the screws 250 effectively clamp the button retainer portion 230 to the bracket portion 240 around the shelf portion of the housing 210.

One may appreciate that in the illustrated embodiment, the O-ring is the only movable portion of the seal system. One may further appreciate that by reducing the total area of the movable seal portion, the risk of seal failure is substantially reduced.

Figure 2B:
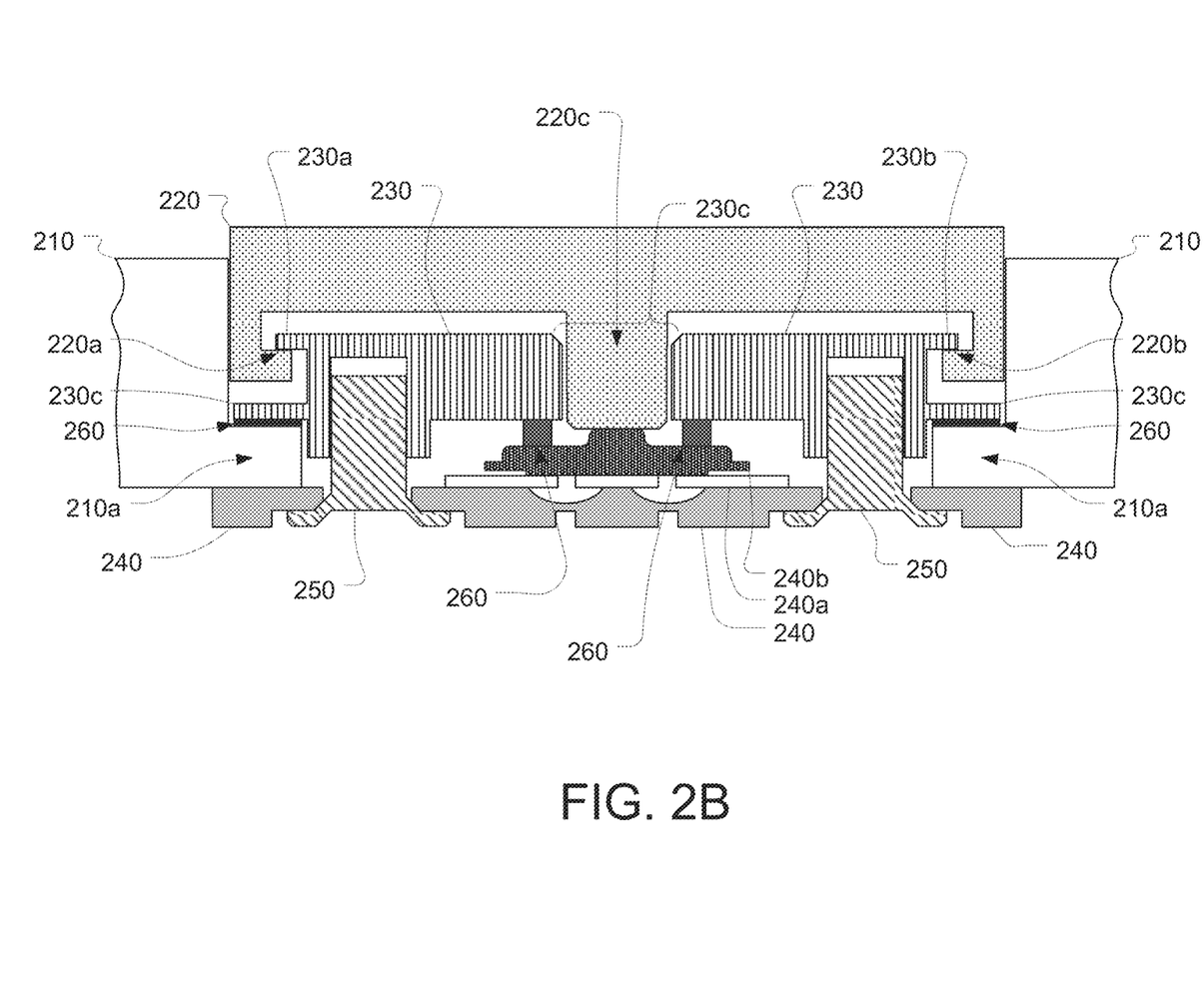
FIG. 2B is an enlarged cross section of an embodiment related to the embodiment shown in FIG. 1, taken along line 2-2.

However, one may further appreciate that the O-ring 270 may not be required. For example in some embodiments, no moving seal may be required, such as the embodiment illustrated in FIG. 2B. As shown, no movable seals are present. Instead, a second seal 260 is positioned along the bottom surface of the aperture 230b, extending to the button 240b. In such an embodiment, the material selected for the button 240b may be water tight or otherwise effective as a seal. In this manner, a seal is formed without moving parts.

Figure 2C:
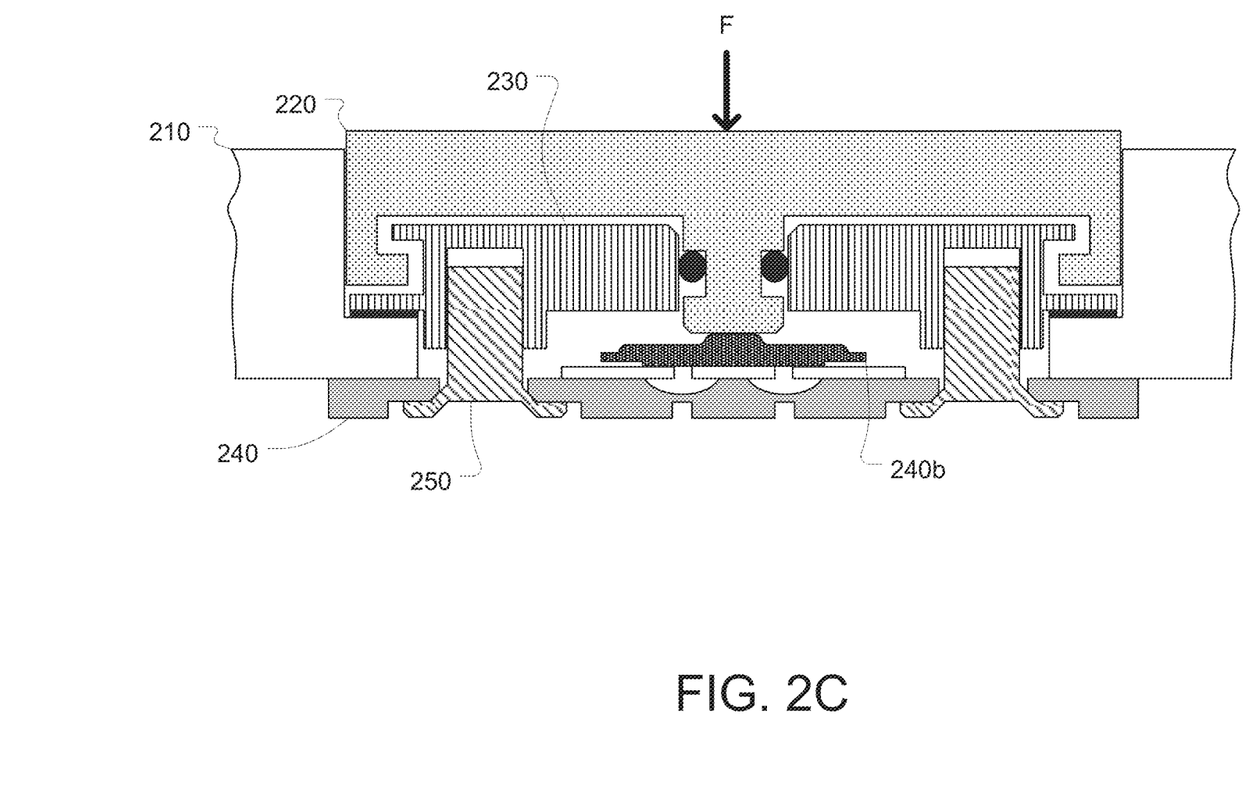
FIG. 2C is an enlarged cross section of the embodiment shown in FIG. 1, taken along line 2-2, showing the result of an application of force on the surface of the sealed button in a first location.
Figure 2D:
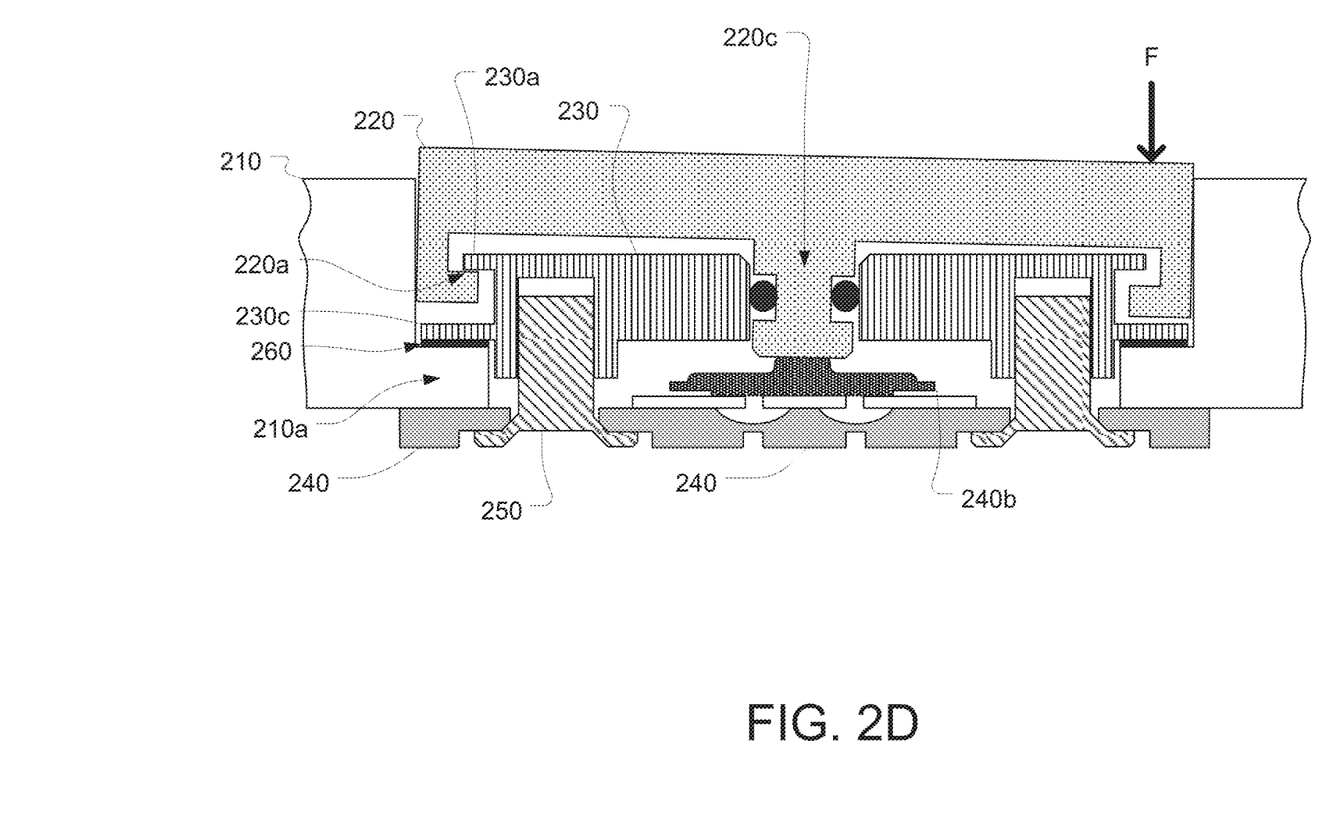
FIG. 2D is an enlarged cross section of the embodiment shown in FIG. 1, taken along line 2-2, showing the result of an application of force on the surface of the sealed button in a second location.

FIG. 2C is an enlarged cross section of the embodiment shown in FIG. 1, taken along line 2-2, showing the result of an application of force F on the surface of the sealed button. As illustrated, the force F is centrally-located about the button cap 220. In the illustrated example, the button cap 220 may uniformly translate downward. As a result, the switch 240b may be activated.

FIG. 2C is an enlarged cross section of the embodiment shown in FIG. 1, taken along line 2-2, showing the result of an application of force F on the surface of the sealed button. As illustrated, the force F is distally located, focused along the right side of the button cap 220. As shown, the uneven application of force may cause the button cap 220 to pivot about the central axis of the central post 220c. However, the amount of pivot is highly limited by the flange portions 230a of the button retainer 230. As shown, the left portion of the button cap 220 rises as a result of the pivot about the central axis of the central post 220c. The rise of this half of the button cap causes the flange portion 220a to also rise.

However, flange portion 220a is stopped immediately by the underside of the flange portion 230a. Because the flange portion 220a is not permitted further vertical displacement, it becomes the pivot point of the button cap 220. As a result, the central post 220c is forced downward to interface with and activate the button 240b.

Figure 3A:
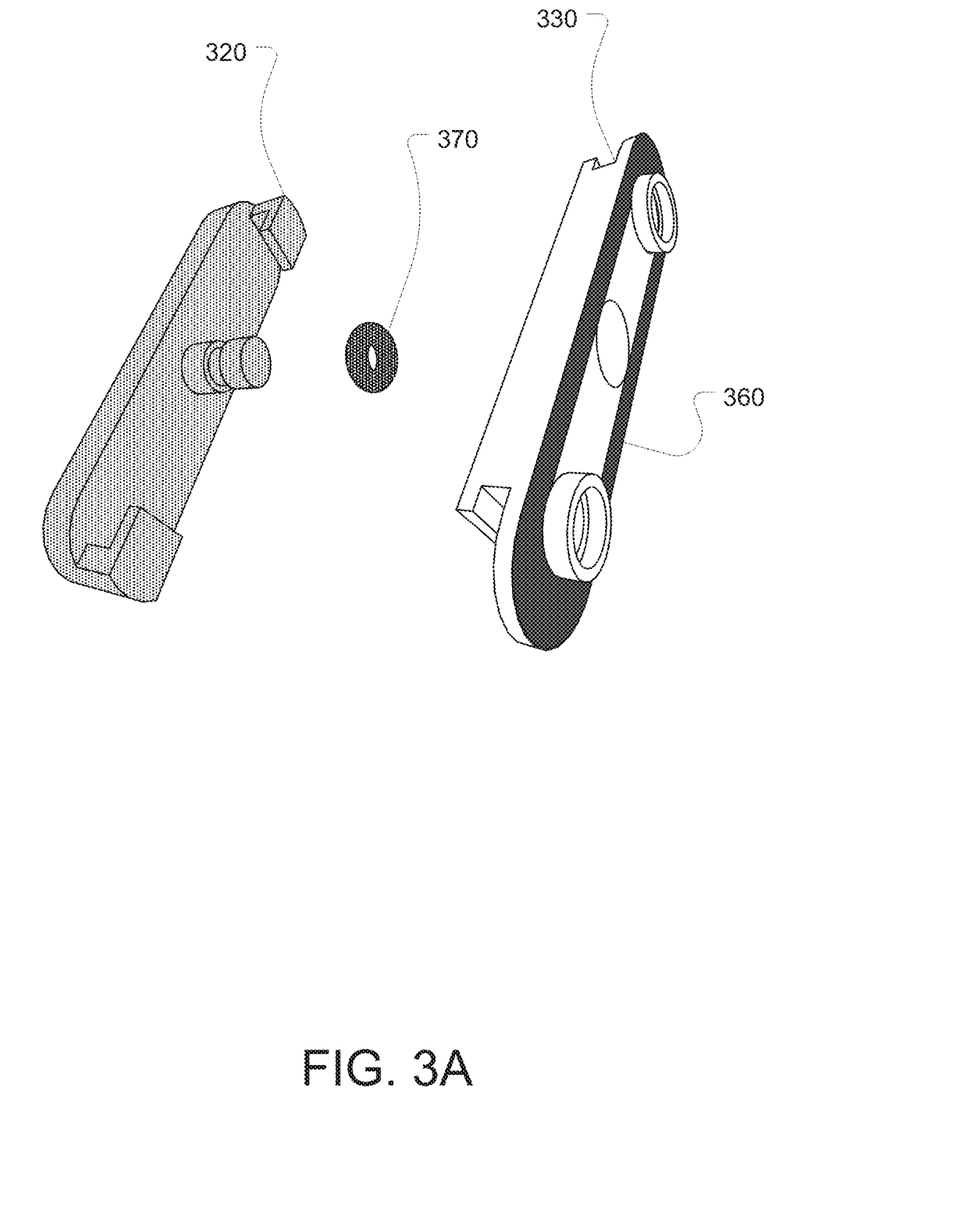
FIG. 3A is an exploded perspective view of a portion of a water tight button.

FIG. 3A is an exploded perspective view of a portion of a water tight button. In the illustrated embodiment, four portions of a water tight button are shown. A button cap 320 may have an oblong shape, such as a rounded rectangle or a lozenge, and may have two extended flange portions longitudinally opposed. In the center of the button cap 320 may be a central post. A second portion of the water tight button may be an O-ring 370 which may be sized to tightly fit around a groove within the central post of the button cap 320. Next, a button retainer 330 may include complimentary geometry to the button cap 320. For example, the button retainer 320 may include to longitudinally opposed flange portions and may include an aperture positioned and proportioned to receive the central post of the button cap 320. Lastly, a perimeter seal 360 may be affixed to the button retainer 360.

Figure 3B:
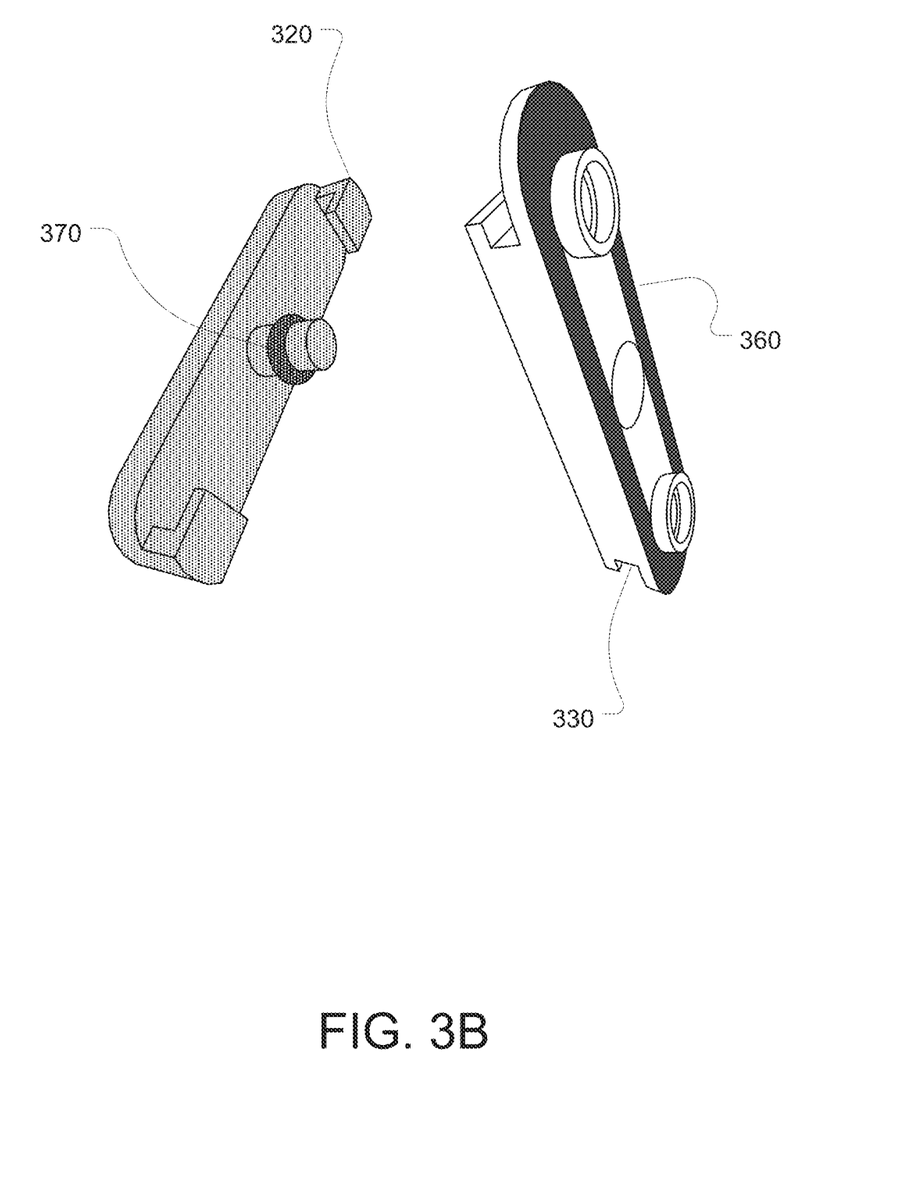
FIG. 3B is an exploded perspective view of the embodiment shown in FIG. 3A, with select components of the sealed button positioned to be assembled.

FIG. 3B is an exploded perspective view of the embodiment shown in FIG. 3A, with select components of the sealed button positioned to be assembled. In this embodiment, the O-ring 370 may be placed around a groove in the button cap 320. The button retainer 330 and seal 360 may be rotated such that the longitudinal axis of the button cap 320 is skewed at an angle with respect to the longitudinal axis of the button retainer 330.

Figure 3C:
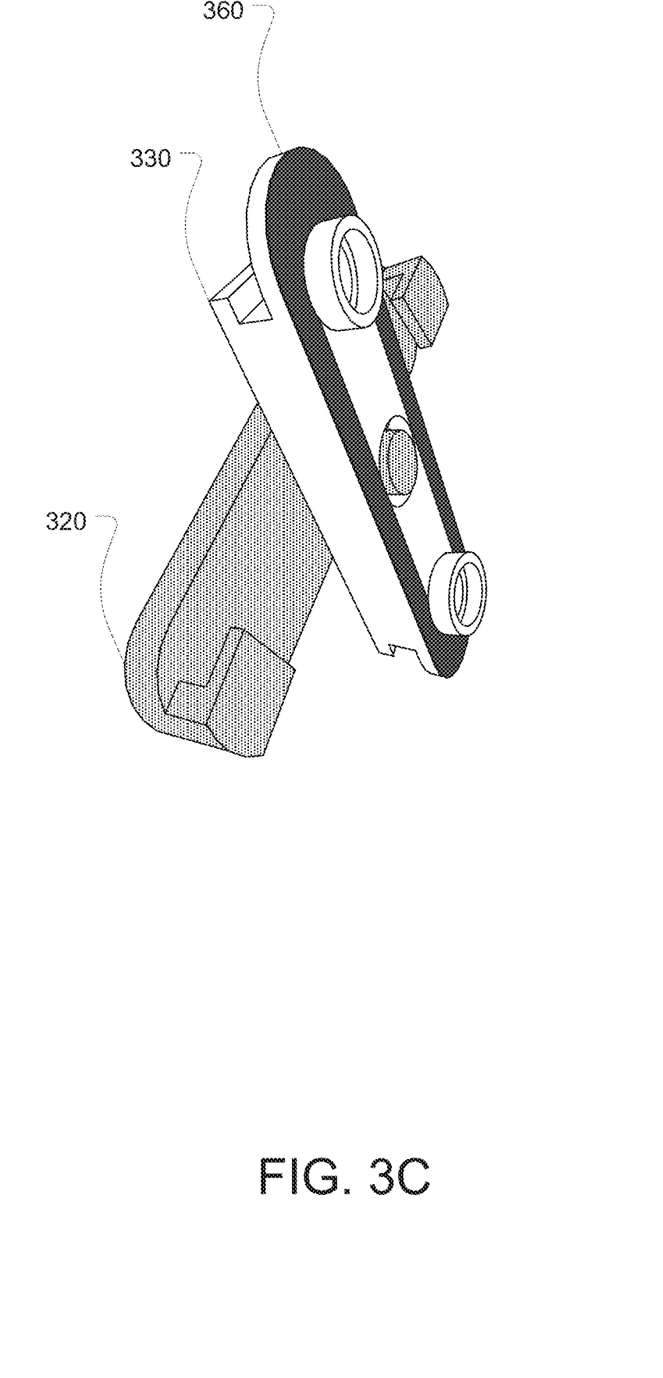
FIG. 3C is a perspective view of the embodiment shown in FIG. 3A, showing select components of the sealed button in a first assembly stage.

FIG. 3C is a perspective view of the embodiment shown in FIG. 3A, showing select components of the sealed button in a first assembly stage. In this assembly stage the button retainer 330 and the seal 360 are positioned over a central post of the button cap 320, while remaining rotated such that the longitudinal axis of the button cap 320 remains skewed at an angle with respect to the longitudinal axis of the button retainer 330.

Figure 3D:
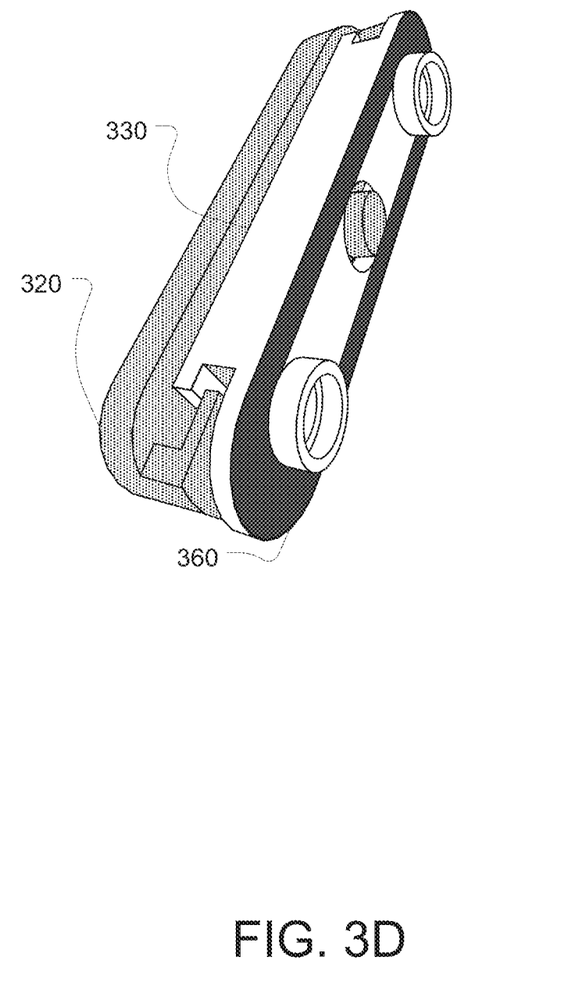
FIG. 3D is a perspective view of the embodiment shown in FIG. 3A, showing select components of the sealed button in a second assembly stage.

FIG. 3D is a perspective view of the embodiment shown in FIG. 3A, showing select components of the sealed button in a second assembly stage. In this assembly stage, the button retainer and the seal 360 are rotated about the central axis defined by the central post of the button cap 320 and aperture of the button retainer 330 so that the longitudinal axis of the button cap 320 is substantially parallel with the longitudinal axis of the button retainer 330. In this manner, complementary geometry of the button cap 320 and the button retainer 330, for example complimentary flange portions, may interlock.

Figure 4:
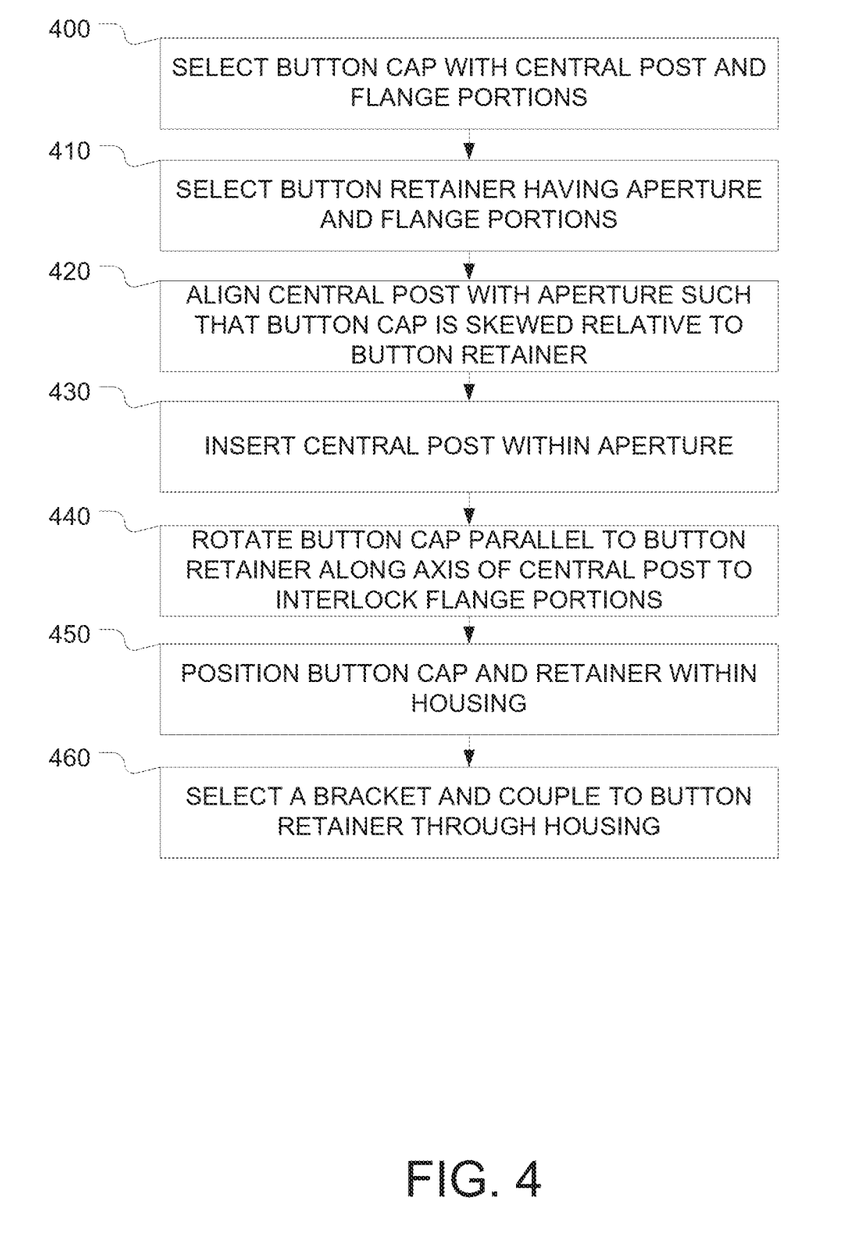
FIG. 4 is a method flowchart illustrating an example process of assembling a sealed button.

FIG. 4 is a method flowchart illustrating an example process of assembling a sealed button. The process may begin at 400, in which a button cap with a central post and flange portions is selected. Next at 410, a button retainer having an aperture sized to receive the central post and flange portions sized to interlock with the flanges of the button cap is selected. Next, at 420, the central post of the button cap selected in 400 is aligned with the aperture from the button retainer selected at 410 so that the longitudinal axis of the button retainer is skewed relative to the button retainer. Once aligned, the central post may be inserted within the aperture at 430. One may appreciate that the angle of skew in 420 may vary from embodiment to embodiment. Next, at 440, the button cap may be rotated so that the button cap is parallel to the button retainer. The rotation may interlock the flange portions of the button retainer and the button cap respectively. Next, at 450, the button cap and retainer, now interlocked, may be positioned within an aperture of a housing. The process may conclude at 460 when a bracket is selected and a coupling is inserted through the bracket to couple the bracket to the button retainer through the housing.

One may appreciate that although many embodiments are disclosed above, that the operations presented in FIG. 4 are meant as exemplary and accordingly are not exhaustive. More or fewer steps may be necessary or desired to practice the methods disclosed herein.

Embodiments of a sealed physical button for use with a portable electronic device that effectively presents ingress of liquids are described herein. Certain embodiments include a button cap that may have flange portions that may interlock with complementary flanges from a button retainer. The button cap may also include a downward oriented central post, proportioned and oriented to interface with the top surface of a button attached to a bracket. The button retainer may include an aperture sized and positioned to receive the central post of the button cap. The button retainer may rest on a shelf within the electronic device housing such that the shelf interposes the bracket and the retainer to form a rigid seal.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

I claim:

1. A button assembly comprising:
    a cap having a flange;
    a post coupled to the cap;
    a housing;
    a retainer positioned below the cap, the retainer having a flange and defining an aperture, the aperture positioned to receive the post; and
    a switch axially aligned with the post; wherein:
    the retainer is attached to the housing to form a seal; and
    the flange of the cap interlocks with the flange of the retainer by twisting about an axis defined by the post.

2. The sealed button assembly of claim 1, further comprising a pressure sensitive adhesive positioned between the retainer and the housing.

3. The button assembly of claim 1, further comprising a post seal positioned between the post and the aperture.

4. The button assembly of claim 1, further comprising a bracket fixedly coupled to the retainer with a screw.

5. The button assembly of claim 1, wherein the cap has a substantially oblong shape.

6. The button assembly of claim 1, wherein the switch is fixedly coupled to a bracket coupled to the retainer.

7. The button assembly of claim 1, wherein the post interfaces a top surface of the switch.

8. The button assembly of claim 1, further comprising a button seal positioned between a top surface of the switch and a bottom surface of the retainer around the perimeter of the aperture.

9. The button assembly of claim 2, wherein the seal comprises a pressure sensitive adhesive.

10. The button assembly of claim 1, wherein the cap and retainer have substantially the same shape.

11. The button assembly of claim 1, wherein the cap is a rounded rectangle.

12. An electronic device comprising:
   a housing defining a button aperture; and
   a button comprising:
      a button cap positioned above the button aperture;
      a button cap retainer positioned below the button cap, the button cap retainer coupled to the button cap by a flange formed around the perimeter of the button cap; and
      a switch portion positioned below the retainer; wherein:
         the retainer is attached to the housing to form a seal; and
         the button cap and button cap retainer interlock together by one of twisting or sliding.

13. The electronic device of claim 12, further comprising a perimeter seal coupled to the button cap retainer.

14. The electronic device of claim 12, the button cap further comprising a central post having a O-ring seal; and
   the button cap retainer further comprising a central aperture positioned to axially align with the switch portion; wherein:
      the central aperture receives the central post and O-ring seal; and
      the central post extends through the central aperture to interface with a top surface of the switch portion.

15. The electronic device of claim 12, wherein the coupling between the button cap retainer and the button cap comprises a screw.

16. A button comprising:
   a button cap;
   a button cap retainer coupled to the button cap;
   a bracket configured to couple to the button retainer and to seal to an interior surface of a housing of an electronic device; and
   an electrical switch positioned between the bracket and the button cap retainer; wherein
      the button retainer is configured to seal to an exterior surface of the housing of an electronic device; wherein
      the button cap and the button cap retainer engage by twisting about a central axis of the button cap retainer.

17. The button of claim 16, wherein the electronic device is a wearable electronic device.

18. The button of claim 16, wherein
   the button cap comprises a post;
   the button retainer defines an aperture; and
   the post extends through the aperture to contact the electrical switch.

19. The button of claim 16, wherein a feature of the button cap is configured to interlock with a feature of the button retainer.

* * * * *